US012728374B2

(12) United States Patent
Shim et al.

(10) Patent No.: US 12,728,374 B2
(45) Date of Patent: Sep. 8, 2026

(54) FLUE GAS FILTRATION MEDIA

(71) Applicant: AHLSTROM OYJ, Espoo (FI)

(72) Inventors: Jesse Shim, Daegu (KR); Taylor Lee, Daegu (KR); James Park, Daegu (KR); Matthew Jeon, Daegu (KR); Chan Cho, Daegu (KR)

(73) Assignee: AHLSTROM OYJ, Helsinki (FI)

( * ) Notice: Subject to any disclaimer, the term of this patent is extended or adjusted under 35 U.S.C. 154(b) by 285 days.

(21) Appl. No.: 17/598,443

(22) PCT Filed: Apr. 3, 2020

(86) PCT No.: PCT/EP2020/059493
§ 371 (c)(1),
(2) Date: Sep. 27, 2021

(87) PCT Pub. No.: WO2020/201475
PCT Pub. Date: Oct. 8, 2020

(65) Prior Publication Data

US 2022/0184538 A1 Jun. 16, 2022

Related U.S. Application Data

(60) Provisional application No. 62/829,827, filed on Apr. 5, 2019.

(51) Int. Cl.
*B01D 39/16* (2006.01)

(52) U.S. Cl.
CPC ...... *B01D 39/163* (2013.01); *B01D 2239/086* (2013.01); *B01D 2239/10* (2013.01);
(Continued)

(58) Field of Classification Search
None
See application file for complete search history.

(56) References Cited

U.S. PATENT DOCUMENTS 2,999,788 A 9/1961 Winthrop
3,018,091 A 1/1962 Duggins
(Continued)

FOREIGN PATENT DOCUMENTS

CN 1932148 A 3/2007
CN 101564619 A 10/2009
(Continued)

OTHER PUBLICATIONS

Chinese Office Action for the corresponding Chinese Application No. 202080027270.5, Date of Report: Oct. 26, 2022; 8 pages.
(Continued)

*Primary Examiner* — Benjamin L Lebron
*Assistant Examiner* — Eric J McCullough
(74) *Attorney, Agent, or Firm* — CANTOR COLBURN LLP

(57) ABSTRACT

Disclosed is a filter medium useful for flue gas filtering that comprises a non-woven fibrous web having at least 80 weight percent of meta-aramid fibers and from 0.1 to 20 weight percent of meta-aramid fibrids, based on weight of fibers and fibrids. The non-woven fibrous web can have average pore size of 20 to 80 micrometers, maximum pore size of 100 micrometers, dry Mullen burst strength of at least 7 kg/cm$^2$, retention of 80% of the dry Mullen burst strength after acid cycling, a filtration efficiency of at least 95% for 2.5 micron particle, and/or a shrinkage of less than 2% after being heated in a dry oven at 205° C. for 2 hours. A method of making the filter medium comprises wet-laying a furnish of the meta-aramid fibers and the meta-aramid fibrids; drying to form the non-woven fibrous web; preferably, calendering; and optionally saturating with binder resin and curing.

13 Claims, 3 Drawing Sheets

(52) U.S. Cl.
CPC ................ *B01D 2239/1216* (2013.01); *B01D 2239/1291* (2013.01)

(56) References Cited

U.S. PATENT DOCUMENTS

| | | | | |
|---|---|---|---|---|
| 4,100,323 | A | 7/1978 | Forsten | |
| 4,698,267 | A | 10/1987 | Tokarsky | |
| 5,026,456 | A | 6/1991 | Esler et al. | |
| 5,171,339 | A | 12/1992 | Forsten | |
| 5,324,742 | A | 6/1994 | Yoshida et al. | |
| 5,789,059 | A | 8/1998 | Nomoto | |
| 5,833,807 | A * | 11/1998 | Ramachandran | D21H 13/26 526/932 |
| 6,103,643 | A | 8/2000 | Forsten | |
| 6,120,643 | A * | 9/2000 | Levit | D21H 13/26 162/146 |
| 6,407,017 | B1 | 6/2002 | Wada et al. | |
| 2004/0168419 | A1 | 9/2004 | Smithies | |
| 2005/0284596 | A1 * | 12/2005 | Conley | D21H 13/26 523/149 |
| 2013/0263385 | A1 * | 10/2013 | Mora | D04H 1/4209 8/115.68 |
| 2015/0360452 | A1 * | 12/2015 | Duart | B32B 27/34 428/220 |
| 2017/0073896 | A1 * | 3/2017 | Wang | D01F 1/10 |

FOREIGN PATENT DOCUMENTS

| | | | | |
|---|---|---|---|---|
| CN | 102114391 | A | 7/2011 | |
| EP | 0446870 | A1 | 9/1991 | |
| EP | 1756360 | B1 | 8/2012 | |
| JP | 2006255693 | A | 9/2006 | |
| JP | 2010240581 | A | 10/2010 | |
| JP | 2011226006 | A | 11/2011 | |
| KR | 100769319 | B1 | 10/2007 | |
| KR | 101547776 | B1 | 9/2015 | |
| KR | 101662023 | B1 | 10/2016 | |
| KR | 20180083999 | A | 7/2018 | |
| WO | 2014137095 | A1 | 9/2014 | |
| WO | WO-2016190163 | A1 * | 12/2016 | D21H 13/26 |

OTHER PUBLICATIONS

International Search Report for the corresponding International Application No. PCT/EP2020/059493; International Filing Date: Apr. 3, 2020; Date of Mailing: Jun. 15, 2020; 5 pages.

Written Opinion for the corresponding International Application No. PCT/EP2020/059493; International Filing Date: Apr. 3, 2020; Date of Mailing: Jun. 15, 2020; 5 pages.

Korean Office Action for the corresponding Korean Application No. 10-2021-7036365, Application Filing Date: Nov. 5, 2021, Date of Mailing: Sep. 15, 2023; English translation, 5 pages.

* cited by examiner

FLUE GAS FILTRATION MEDIA

CROSS-REFERENCE TO RELATED APPLICATIONS

This application is a National Stage application of PCT/EP2020/059493, filed Apr. 3, 2020, which claims benefit of U.S. provisional Application No. 62/829,827 filed on Apr. 5, 2019, both of which are incorporated by reference herein in their entirety.

FIELD OF THE INVENTION

This invention relates to media for filtration, in particular flue gas filtration with non-woven flue gas filtration media.

BACKGROUND

Filtration of flue gas to remove hot dust is important for waste incinerators, metallurgical industries, coal-fired power plants, and other industries producing flue gases, in order to limit or eliminate particulate pollution.

For example, filter bags have been used for flue gas filtration, where the bag comprises woven yarns, felts, needle felts, or scrim-supported needle felt filter media. These filter media are typically made from high temperature resistant fibers such as PPS (Polyphenylene sulfide), meta-Aramid, PI (Polyimide), and PTFE (Polytetrafluorethylene). However, filter bag media have a very low filtration efficiency due to the open structure of media. It also takes a large volume of media in a filtration system and incurs high running costs.

A pulse jet cleaning system using cartridge filters is an alternative filter system to bag filter system. Pulse jet cleaning systems need high efficiency and dense filter media because particles are filtered via surface filtration. Many current commercially available cartridge filters for flue gas filtration are still using needle punched felts or spun-laced felt, even though those filter media have low filtration efficiency and low performance during pulse jet cleaning. Felt media are also unsuitable since they may rupture when pulsed with back-pressure.

There remains a need for cost-effective filter media having a high heat resistance, high filtration efficiency, and good acid-resistance. It would be a further advantage if the filter media had a smooth surface and sufficient mechanical strength for cleaning by mechanisms such as pulse jet cleaning.

SUMMARY OF THE INVENTION

Disclosed herein is a filter medium, such as particularly a flue gas filter medium, the medium comprising a non-woven fibrous web comprising at least 80 weight percent of meta-aramid ("m-aramid") fibers and from 0.1 to 20 weight percent of meta-aramid fibrids, each based on total amount of fibers and fibrids.

Also disclosed here in a filter medium, such as particularly a flue gas filter medium, comprising a non-woven fibrous web characterized by an average pore size of 20 to 80 micrometers, a maximum pore size of 100 micrometers, a dry Mullen burst strength of at least 7 kilograms per square centimeter, retention of 80% of the dry Mullen burst strength after acid cycling, a filtration efficiency of at least 95% for 2.5 micron particle, and a shrinkage of less than 2% after being heated in a dry oven at 205° C. for 2 hours.

Also disclosed herein is the use of the above flue gas filter medium in flue gas filtering.

Also disclosed herein is an assembly, comprising a flue gas inlet manifold, a flue gas outlet manifold, and a filtering apparatus positioned between the flue gas inlet manifold and the flue gas outlet manifold, wherein the filtration apparatus includes the filter medium (particularly the flue gas filter medium disclosed herein).

Also disclosed herein is a method of making a filter medium (particularly a flue gas filter medium) comprising wet-laying a furnish comprising the meta-aramid fibers and the meta-aramid fibrids to form a mat; drying the mat to form a non-woven fibrous web; and, preferably, calendering the non-woven fibrous web.

DETAILED DESCRIPTION OF THE INVENTION

Figure 1:
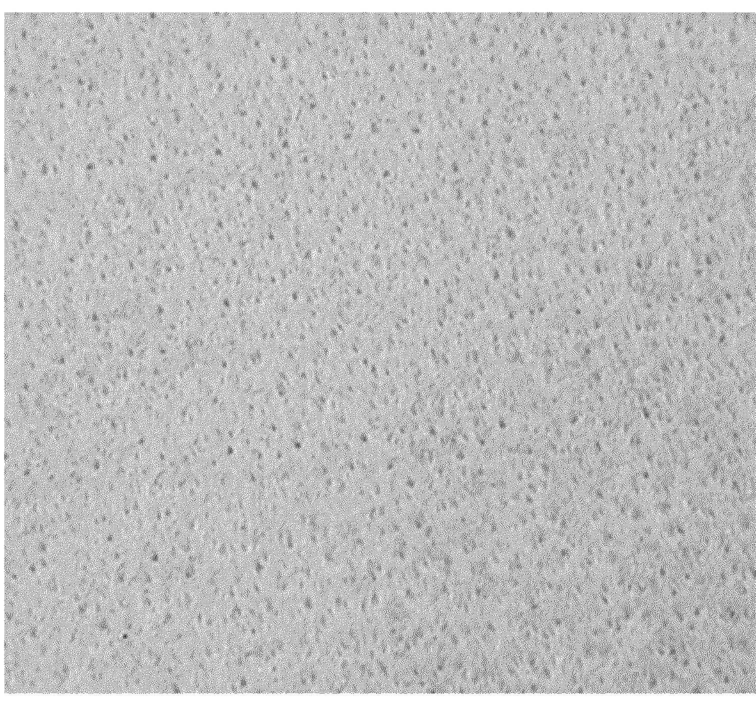
FIG. 1 is a scanning electron micrograph of the surface of a conventional meta-aramid felt (e.g. needle punched felt).

Disclosed herein is a filter medium, and particularly a flue gas filter medium for use in waste incinerators, metallurgical industry processes, coal-fired power plants and other industries producing flue gas containing unwanted particulates. The medium comprises a non-woven fibrous web, and can be produced by a wet-laying method preferably with calendering after drying. The medium includes a combination of meta-aramid fibers and fibrids. Among the benefits of using meta-aramid fibers is that they simultaneously can be used in wet laid operations while also providing excellent mechanical strength. Certain other high temperature resistant polymers (e.g. polyimide and PTFE) may not be suitable for use in wet laid operations while glass fibers can be wet-laid but have a lower media strength. The meta-aramid fibers can have a fiber tenacity of more than 5 (e.g. 5.1, 5.2 or 5.3) g/denier. The meta-aramid fibers and fibrids can be characterized by high temperature resistance e.g. up to 200° C. The meta-aramid fibers and fibrids can be the only fibers and fibrids used with no other fibers or fibrids are included. The meta-aramid fibrids are present in an amount of up to 20 weight percent based on total weight of the meta-aramid fibers and fibrids. Calendering facilitates achieving high density, strength, and smooth surface. The calendered medium can be further saturated by resin, e.g. phenolic resin, to get more strength and acid resistance. This medium shows one or more or all of the following properties: heat resistance, good dimensional stability at high temperature, acid resistance, filtration efficiency, a smooth surface, or sufficient strength to withstand pulse jet cleaning. "Acid resistance" as used herein means a filter medium which retains at least 50% of burst strength determined in accordance with ASTM D751 after acid cycling as described herein.

While not wishing to be bound by theory, it is believed that the combination of meta-aramid fibers and meta-aramid fibrids may enable a dense structure and/or m-aramid fibrids function as a binder for the media. This can facilitates the media retaining mechanical properties (e.g. burst strength) particularly in heat and/or acid environment. This enables the filter medium disclosed herein to have good long term high temperature resistance, flame retardancy and dimensional stability. Although meta-aramid fibers have lower tenacity than para-aramid fibers, the combination of meta-aramid fibers and meta-aramid fibrids in the inventive media enables the media to overcome any associated deficiency and have the desirable properties described herein.

The meta-aramid fibers (also referred to herein as flocs) that can be used can be any known meta-aramid fiber. Such flocs include flocs commercially available from Huvis and Toray Chemical. These fibers can be characterized by one or more or all of the following: a denier of at least 0.3 or 1 and up to 10 or 5 g/9000 m (i.e. 0.3 to 10, or 0.3 to 5, or 1 to 10, or 1 to 5 g/9000 m); and a fiber diameter from 5 or 10 to 32 or 23 micrometers (μm) (i.e. 5 to 32, 5 to 23, 10 to 32 or 10 to 23 micrometers). The meta-aramid fibers can be manufactured by known processes, for example dry solvent spinning, wet solvent spinning. When used in a wet laid process as discussed below, the meta-aramid flocs are cut into segments, which can be referred to in art staple fibers. In an aspect these segments can have a length of at least 1 or 3 to 50 or 30 mm (i e 1 to 50, 1 to 30, 3 to 50, or 3 to 30 mm) The meta-aramid flocs can be straight or crimped. The fibers may have various cross section shapes. For example the fibers may have cross sections with irregular or regular shapes. Examples of various cross section shapes include a dog-bone, oval, trilobal, or circular (round) shape. A round shape can be helpful in providing a low restriction of air flow. A more complex shape, e.g. a dog-bone, can provide efficiency in filtration. According to one aspect, one type of meta-aramid fiber is used. According to another aspect combinations of two or more types of meta-aramid fibers having different characteristics (e.g. cross-section shape, diameter, etc.) may be used.

The meta-aramid fibrids that can be used can be any known meta-aramid fibrids, and can have a melting point or decomposition point above 320° C. As is known in the art, fibrids are not fibers, but rather non-granular, fibrous (fiber-like) or filmy particles interconnected by webs. The meta-aramid fibrids can have an average length of 0.1 or 0.2 to 2 or 1 millimeter (mm) (i.e. ranges of 0.1 to 2 mm, 0.1 to 1 mm, 0 2 to 2 mm, or 0.2 to 1 mm), and aspect ratio (length:width) of 5:1 to 50:1. According to certain aspects, the fibrids can have a width dimension of 15 to 50 microns. The thickness dimension of the fibrid web is less than 2 or less than 1 mm, typically on the order of a fraction of a micrometer. Fibrids can be used in the manufacture of a filter medium, and can be function as a binder by physically entwining about other components of a filter medium. The fibrids can be prepared by any method, including for example by a fibridating apparatus of the type disclosed in U.S. Pat. No. 3,018,091, where a polymer solution is precipitated and sheared in a single step. Suitable fibrids are commercially available from Huvis and Toray Chemical. The fibrids can have an identical or different chemical composition than the meta-aramid flocs used in the medium.

The meta-aramid fibers and fibrids can be formed into a non-woven fibrous web by known paper-making processes. In general, process includes providing a mat or web of fibers, and preferably calendering the mat or web. The mat or web can be made by a wet laid process, air laid process or a foam laid process. According to an aspect, the non-woven fibrous web may be made by any conventional “wet-laid” paper-making technology. Among the advantages of wet-laid non-woven fibrous web are one or more of the following: high density, good strength (e.g. Dry Mullen burst strength of at least 7 kg/cm$^2$), smooth surface, small pores, and high filter efficiency. Thus, for example, predetermined amounts of fibers and the fibrids (along with any optional components, such as the glass fibers, basic thermoplastic fibers and/or additives) and water may be placed in a pulper or beater. The fibers are mixed and dispersed by the pulper or beater evenly in the water to form a slurry batch. Some mechanical work can also be performed on the fibers to affect physical parameters, such as permeability, surface properties and fiber structure. The slurry batch may thereafter be transferred to a mixing chest where additional water is added and the fibers are homogenously blended. The blended slurry may then be transferred to a machine chest where one or more slurry batches can be combined, allowing for a transfer from a batch to a continuous process. Slurry consistency is defined and maintained by agitation to assure even dispersion of fibers. In this regard, the slurry may optionally be passed through a refiner to adjust physical parameters. The slurry (also referred to as a furnish) is then transferred to a moving wire screen where water is removed by means of gravity and suction. As water is removed, the fibers form into a non-woven fibrous web having characteristics determined by a number of process variables, including for example, the slurry flow rate, machine speed, and drainage parameters. The formed mat may optionally be compressed while still wet so as to compact the paper and/or modify its surface characteristics. The wet fibrous mat is then moved through a drying section comprised of heated rollers (or “cans” in art parlance) where most of the remaining entrained water is removed to form a non-woven fibrous web.

The relative amount of meta-aramid fibers and fibrids is selected to provide the desired properties in the non-woven fibrous web of the filter medium, and can be at least 80 weight percent of meta-aramid fibers and from 0.1 or 1 or 2 or 3 or 4 weight percent of meta-aramid fibrids and no more than 20 or 15 weight percent of meta-aramid fibrids, each based on total weight of fibers and fibrids. Including more than 20 weight percent fibrids can lead to a structure with such a tight porous structure that filtration performance is impaired. In other words, the non-woven fibrous web of the filter medium can comprise 80 to 99.5, 80 to 99, 80 to 98, 80 to 97, 80 to 96, 85 to 99.5, 85 to 99, 85 to 98, 85 to 97, or 85 to 96 weight percent meta-aramid fibers based on total weight of fibers and fibrids. Further the non-woven fibrous web of the filter medium can comprise 0.1 to 20, 0.1 to 15, 1 to 20, 1 to 15, 2 to 20, 2 to 15, 3 to 20, 3 to 15, 4 to 20, or 4 to 15 weight percent meta-aramid fibrids based on total weight of fibers and fibrids. Optionally, para-aramid fibers, glass fibers and wet/dry strength agent can be added, if they do not lower the performance of the present invention.

The non-woven fibrous web is then calendered. For example, in a wet-laid process, the non-woven fibrous web that is formed may be taken up on a roll for further processing or passed directly to a calendering section. The calendering section comprises of at least one pair of opposed calendering rolls, which operate to press and consolidate the mass of wet-laid fibers. The calendering can occur at temperature in the range of, for example, 100° C. or 150° C. or 180° C. to 250° C. or 230° C. (ranges of 100 to 250, 100 to 230, 150 to 250, 150 to 230, 180 to 250, or 180 to 230° C.) and at pressure in the range of, for example 1 kN/m to 150 kN/m. Calendering machine line speed can be selected, for example, to be between about 1 m/min to about 50 m/min The meta-aramid flocs and fibrids in the non-woven fibrous web cannot melt at this range of calendering temperature, but the flocs and fibrids can be shrunk and pressed. Calendering has been found to improve smoothness of the surface of the medium and provides a higher density and strength for the medium, which is desired in flue gas cartridge filters.

The non-woven fibrous web can be saturated with binder resin. For example, a binder resin can be applied to the non-woven fibrous web by any conventional means, such as dipping, spray coating, roller (gravure) application and the like. Heat may then subsequently be applied to dry the saturated non-woven fibrous web and cure the resin. The binder resin can comprise polymers, copolymers, or mixtures thereof. For example, the binder resin can comprise phenolic, polyurethane, polyacrylate, polyimide, polyamide, polyester, polyethyleneimine, or epoxy. The binder resin is preferably a phenolic resin. The binder resin is selected to improve the strength and acid resistance of the medium without any damage of heat resistance and non-flammable characteristics of the non-woven fibrous web comprising meta-aramids. For example, phenolic resin can be commercially sourced from Kangnam Chemical and Kolon Chemical. The non-woven fibrous web can be saturated with the phenolic resin after calendering. Alternatively or in addition, the non-woven fibrous web can be saturated with the phenolic resin saturation before calendering.

The filter medium comprising non-woven fibrous web can have one or more or all of the following properties:

The non-woven fibrous web of the filter medium can have a basis weight or grammage of at least 80, at least 100, at least 150, at least 200, or at least 250 grams/$m^2$.

The non-woven fibrous web of the filter medium can have a thickness of 0.3 or 0.5 to 3 or 2 mm (i e 0.3 to 3, 0.3 to 2, 0.5 to 3, or 0.5 to 2 mm) The caliper (thickness) of the medium is measured according to the International Organization for Standardization (ISO) Standard ISO 534(2011), “Paper and board-Determination of thickness, density and specific volume”. Further, the non-woven fibrous web of the filter medium can have a density of at least 0.3 g/$cm^3$.

The non-woven fibrous web of the filter medium can have a largest pore size of no more than 150 micrometers (μm), or no more than 120 μm, or no more than 100 μm. The average pore size can be from 20 or 30 or 40 micrometers to 100 μm or 90 μm or 80 μm (average pore size ranges of 20-100, 20-90, 20-80, 30-100, 30-90,30-80, 40-100, 40-90, 40-80 μm). Pore size (μm) is determined by the American Society of Testing and Materials (ASTM) Standard 316-03 (2011).

The non-woven fibrous web of the filter medium can have a dry Mullen burst strength of at least 7, or at least 10, or at least 12 kilograms per square centimeter (kg/$cm^2$) each as determined in accordance with ASTM D751.

The non-woven fibrous web of the filter medium can retain at least 50% or at least 60%, or at least 70%, or at least 75% or at least 80% of its original dry Mullen burst strength, determined in accordance with ASTM D751 after acid cycle testing. The acid cycle testing comprises submerging the sample in a 1N solution of sulfuric acid for five minutes and then heat exposure at 350° F. (175° C.) for ten minutes and repeating for four cycles.

The filter medium (and/or the non-woven fibrous web) is tested by “air test” following the ISO5011 test standard as follows: A 100 $cm^2$ area of filter medium is challenged with ISO A2 fine test dust at a dust concentration of 100 mg/$m^3$ and a face velocity of 20 cm/s. The dust capture efficiency is measured suing photodetector. The efficiency is reported for each particle size and is measured using the formula [1−(C/C0)]*100%, where C is the measured dust concentration after passage through the filter medium and C0 is the concentration before passage into the filter medium. The inventive filter medium has a filtration efficiency of 90%, or more than 95% for particles that are 2.5 μm in diameter. A Palas MFP1000 instrument can be used for the air test.

The non-woven fibrous web of the filter medium disclosed herein can have high temperature resistance. For example, the medium does not ignite when tested according to British Standard 4790. The medium can have a temperature resistance up to 200° C. For further example, the shrinkage of the medium after 2 hours in a dry oven at 205° C. is less than 2%, or less than 1%, or less than 0.75%.

The non-woven fibrous web of the filter medium can have a permeability of at least 15 or at least 20 cubic feet per minute at 125 Pa according to ASTM Standard D737: Standard Test Method for Air Permeability of Textile Fabrics.

Figure 2:
FIG. 2 is a scanning electron micrograph of the surface of a non-woven fibrous web of a filter medium according to this invention.

As shown in FIG. 1, the surface of the conventional meta-aramid felt or needle punched felt medium have a very open structure and rough surface, so that they are not suitable for flue gas cartridge filters adopting pulse jet cleaning system. In contrast, filter medium as disclosed herein can provide a more dense structure and/or smooth surface as shown in FIG. 2. The wet-laid process and hot calendering treatment are effective to achieve such structure and/or surface.

The non-woven fibrous web can be laminated to one or more other layers. For example, the non-woven fibrous web (the first non-woven fibrous web) described above may be laminated to a second non-woven fibrous web which is the same or different from the first non-woven fibrous web. As another example, the non-woven fibrous web may be laminated to another substrate such as a polymeric sheet, film or membrane. Examples of such materials include polytetrafluoroethylene (PTFE) or expanded polytetrafluoroethylene (ePTFE) membrane. Such laminated structures can show excellent high temperatures resistance up to 200° C. The filter medium can be provided with a wire backing.

The medium can be used in in a cartridge filter for flue gas filtration. The flue gas filter assembly comprises a flue gas inlet manifold, a flue gas outlet manifold, and at least one cartridge filter positioned between the flue gas inlet manifold and the flue gas outlet manifold, the at least one cartridge filer comprising the filter medium. The filter medium can be supported, for example over a wire cage support. The filter medium can be provided as a removable cartridge in the filtration apparatus.

The medium can also be used in other filtration such as other gas filtration or liquid filtration.

The invention is further illustrated by the following non-limiting examples.

EXAMPLES

The materials used in the Examples are described in Table 1.

TABLE 1

| Name | Description, Trade name | Source |
|---|---|---|
| Meta-aramid fibrids | MetaOne Fibrid | Huvis |
| Meta-aramid floc-1 | MetaOne Fiber, 2D*6 mm | Huvis |
| Meta-aramid floc-2 | ARAWIN FLOC, 2D*6 mm | Toray Chemical |
| Phenol resin | KC 4806-2 | Kangnam Chemical |

Example 1

Preparation of the Filter Medium

Handsheets were prepared by handsheet former (e.g. using JIS P8209 Method of Preparing Handsheets for Pulp-testing") with the fiber recipe of 4 wt % meta-aramid fibrids, 48 wt % of meta-aramid floc-1, and 48 wt % meta-aramid floc-2. The consistency of fiber slurry was 1.5% (i.e. 1.5% solids in water). Meta-aramid floc-1 of Huvis is produced by wet solvent spinning method and it has round shape, so that it is good for low restriction of air flow. Meta-aramid floc-2 of Toray Chemical is produced by dry solvent spinning method and it has dogbone fiber cross section, so that it is good for high efficiency. The handsheet was treated by hot calendering at 170° C. with the pressure of 50 kN/m and machine speed of hot calendering was 4 m/min After calendering, the medium was saturated with phenolic resin and cured fully by dryer oven. The resin content of the saturated medium was 30 wt %. The medium had the properties shown in Table 2. Also shown in Table 2 are properties for a commercially available m-aramid bag filter.

TABLE 2

| Physical properties | unit | Example 1 medium | Comparative m-aramid bag filter |
|---|---|---|---|
| Grammage | g/m$^2$ | 285 | 595 |
| Caliper (Thickness) | mm | 1.02 | 2.33 |
| Air permeability (at 125 Pa) | cfm | 24.3 | 24.7 |
| Mullen burst strength (Dry)* | kg/cm$^2$ | 15.8 | >15 |
| Maximum pore size | µm | 90.1 | 1078.4 |
| Mean pore size | µm | 65.6 | 389.3 |

Air permeability was determined in accordance with ASTM Standard D737: Standard Test Method for Air Permeability of Textile Fabrics. The air flow through the medium is reported in cubic foot per minute per square foot of sample (cfm/sf or cfm).

Dry Mullen burst strength was determined in accordance with ASTM D751.

Pore size was determined in accordance with American Society of Testing and Materials (ASTM) Standard 316-03 (2011).

Example 2

Test of Dry Shrinkage.

Shrinkage was evaluated by measuring dimensions of samples before and after placing the sample in the dry oven at 205° C. for 2 hours. (See Table 3) The shrinkage ratio is 0.67%. This exceeds the desired specification of shrinkage ratio of less than 2% after dry heating 205° C. for 2 hours.

TABLE 3

| Specimen No. | 1 | 2 |
|---|---|---|
| Before dry heating | 150 mm | 150 mm |
| After dry heating | 149 mm | 149 mm |
| Shrinkage ratio | 0.67% | 0.67% |

Example 3

Test of Heat and Flame Resistance

Specimens were tested for heat and flame resistance according to the British Standard 4790 (Determination of the effects of a small source of ignition on textile floor coverings (hot metal nut method)). This testing method determines the effect of a source of ignition. To run this test, the metal nuts are heated up to 900° C. in a muffle furnace and then exposed for 30 seconds onto the filter medium. The results are shown in Table 4. The non-woven medium had no ignition in this test.

TABLE 4

| Specimen No. | After Flame(s) | Time of the effects of ignition to reach the clamping ring(s) | The greatest radius to the nearest 5 mm of the affected area(mm), "use surface" |
|---|---|---|---|
| 1 | 0 | NA | 1 |
| 2 | 0 | NA | 1 |
| 3 | 0 | NA | 1 |

Example 4

Acid Resistance Test

To determine acid resistance properties, the specimens were tested in a 1N solution of sulfuric acid, the method consisting of submersion for 5 minutes and heat exposure to 350° F. (175° C.) for ten minutes for four cycles. A conventional 100% m-aramid filter bag medium retains approximately 10% of its original dry Mullen burst strength (ASTM D751) after acid cycle testing. Results are shown in Table 5 where kgf/cm$^2$ is kilograms of force per square centimetre. The medium as disclosed herein retains 86.6% of its original dry Mullen burst strength after acid cycle testing.

TABLE 5

| | Dry Mullen burst Strength |
|---|---|
| Before acid cycle | 15.95 kgf/cm$^2$ |
| After acid cycle | 13.82 kgf/cm$^2$ |
| Retained strength (%) | 86.6% |

Example 5

Filtration Efficiency Test

Handsheets of the inventive medium were tested air test as described herein using a Palas MFP 1000 instrument with ISO A2 fine dust. The efficiency at 2.5 µm particle size (PM 2.5) is approximately 95%.

Example 6

Additional handsheets were made substantially according to the process set forth in Example 1, but with varying the amount of fibrid. In addition, it was found that if there was no fibrid in the recipe, the filter medium would not adequately form due to inadequate bonding. If there is too much fibrid, air permeability becomes too low for effective use. See Table 6.

TABLE 6

| | Specimen | | | | | | | | |
|---|---|---|---|---|---|---|---|---|---|
| | A (Fibrid at 4 wt. %) | | | B (Fibrid at 10 wt %) | | | C (Fibrid at 20 wt %) | | |
| | Fiber recipe (wt. %) | | | | | | | | |
| | Huvis m-aramid fibrid 4% Huvis m-aramid floc 2D * 6 mm 48% Toray m-aramid floc 2D * 6 mm 48% | | | Huvis m-aramid fibrid 10% Huvis m-aramid floc 2D * 6 mm 45% Toray m-aramid floc 2D * 6 mm 45% | | | Huvis m-aramid fibrid 20% Huvis m-aramid floc 2D * 6 mm 40% Toray m-aramid floc 2D * 6 mm 40% | | |
| | Process | | | | | | | | |
| | Before calendering | After calendering | After Saturation | Before calendering | After calendering | After Saturation | Before calendering | After calendering | After Saturation |
| Basis weight (g/m$^2$) | 199.9 | 199.9 | 270.3 | 198.9 | 198.9 | 298.2 | 199.7 | 199.7 | 275.6 |
| Caliper (mm) | 1.239 | 0.443 | 0.857 | 1.212 | 0.413 | 0.772 | 1.147 | 0.403 | 0.676 |
| Density (g/cm$^3$) | | | 0.315 | | | 0.386 | | | 0.381 |
| Air permeability (of m) at 125Pa | 106.3 | 19.4 | 40.1 | 56.1 | 7.6 | 21.1 | 9.8 | 0.8 | 2.7 |
| Dry Mullen Burst strength (kgf/cm$^2$) | | | 11.9 | | | 17.6 | | | 15.4 |
| Stiffness (mgs) | | | 6400 | | | 9245 | | | 6223 |
| Max poresize (μm) | | | 72.8 | | | 65.5 | | | 49.3 |
| Mean poresize (μm) | | | 55.6 | | | 32.0 | | | 23.7 |

Example 7

Pulse Jet Cleaning

Figure 3:
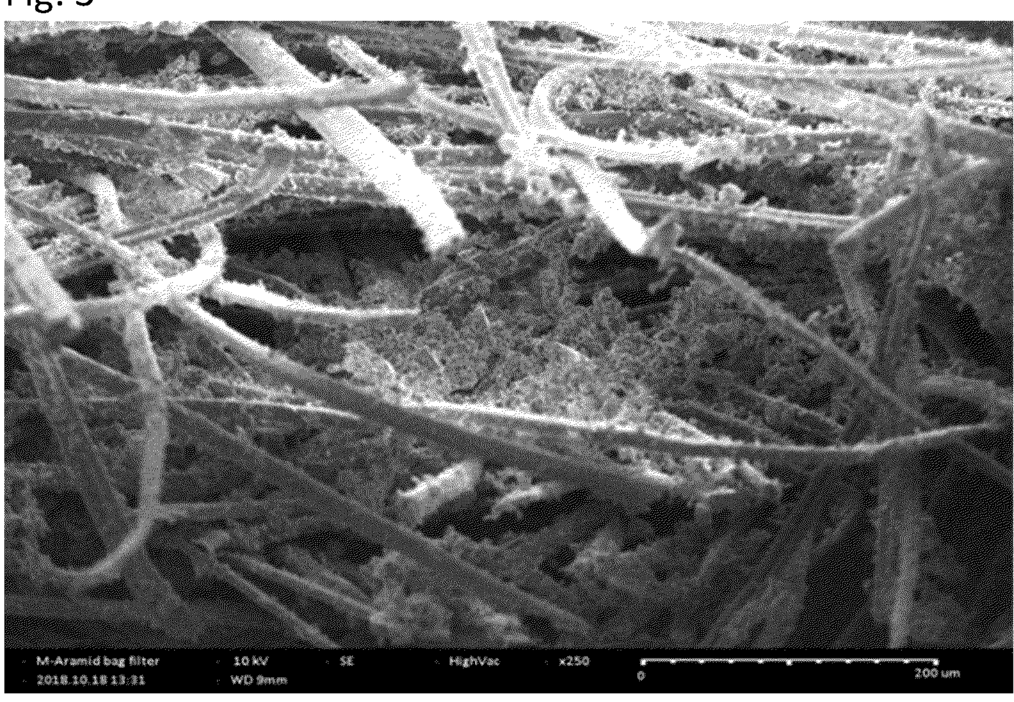
FIG. 3 is an SEM of a meta-aramid felt material after dust loading.
Figure 4:
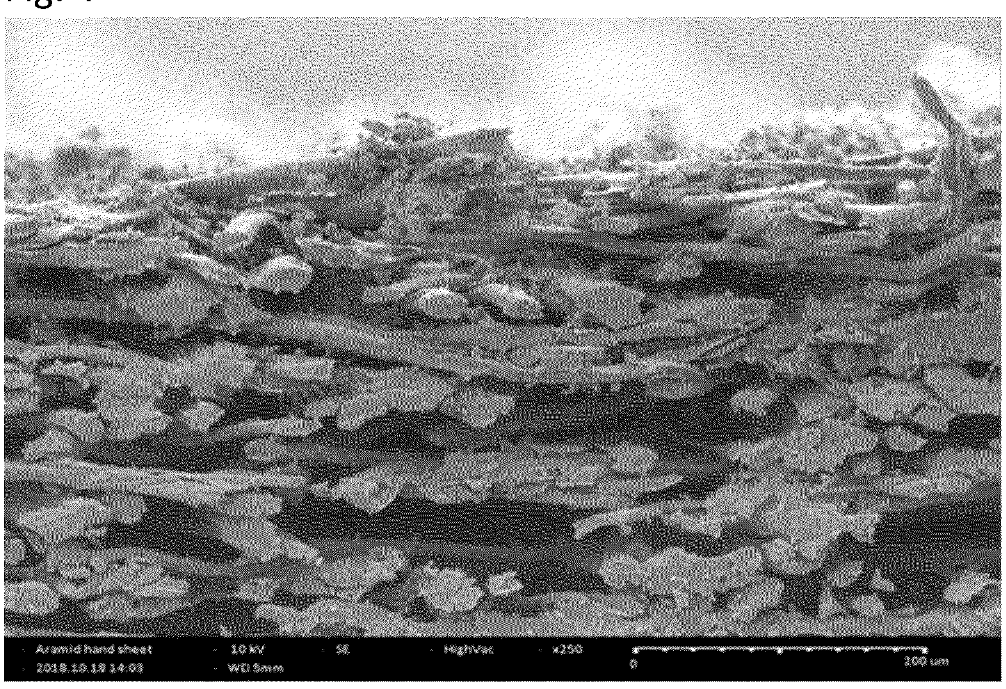
FIG. 4 is an SEM of a filter medium according to this invention after dust loading.
Figure 5:
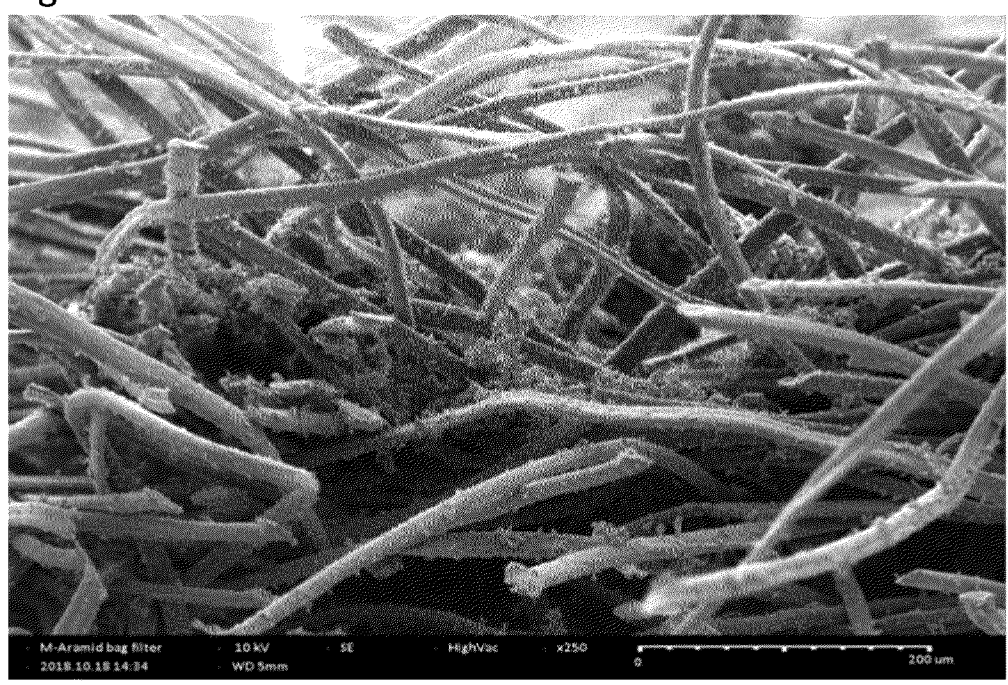
FIG. 5 is an SEM of meta-aramid felt material after dust loading and subsequent jet pulse cleaning.
Figure 6:
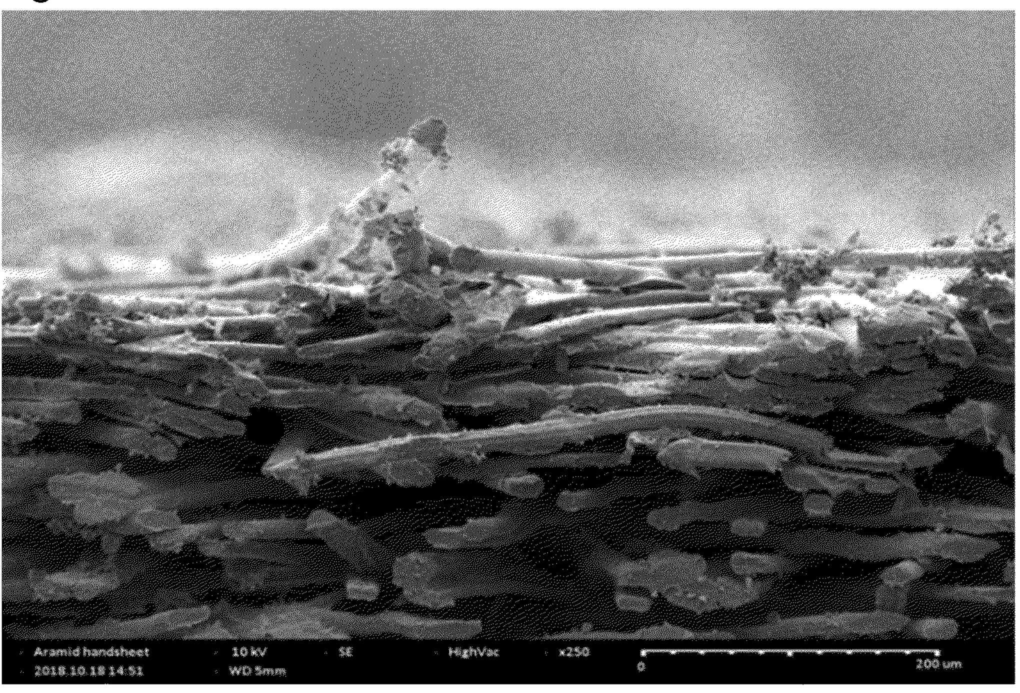
FIG. 6 is an SEM of a filter medium according to this invention after dust loading and subsequent jet pulse cleaning.

Filter media made according to the process as described in Example 1 and a sample from a meta-aramid felt filter bag were compared for dust loading and jet pulse cleaning. For dust loading samples were placed on a Palas MFP1000 for ISO A2 Fine Dust with RBG 1000 setting value of 1030 rpm, 8 mm/hour for 20 minutes. For pulse cleaning, compressed air at 5 kgf/cm$^2$ was directed on the clean side of the filter sample for 30 seconds. Distance between air gun and samples was 15 cm. Samples were cut and the cross section examined under scanning electron microscopy (SEM) for dust loading and after pulse cleaning FIG. 3 is an SEM showing the dust loading of the metal aramid felt filter bag material. FIG. 4 is an SEM showing the dust loading of a filter medium as in Example 1. The SEMs illustrate that a filter medium of Example 1 captures more dust on the surface as compared to the meta aramid felt filter material. FIG. 5 is an SEM showing the meta-aramid bag filter medium after pulse cleaning and shows dust still located inside the medium. FIG. 6 is an SEM showing filter medium as in Example 1 after pulse cleaning and shows the clean surface obtained after jet pulse cleaning.

This disclosure is further illustrated by the following Aspects, which are not intended to limit the claims.

Aspect 1. A filter medium, preferably a flue gas filter medium, the medium comprising non-woven fibrous web comprising at least 80 weight percent of meta-aramid fibers and from 0.1 to 20 weight percent of meta-aramid fibrids, each based on total amount of fibers and fibrids.

Aspect 2. A filter medium according to aspect 1 wherein the non-woven fibrous web is calendered.

Aspect 3. A filter medium according to aspect 1 or 2 wherein non-woven fibrous web further comprises a binder resin, preferably a phenolic resin.

Aspect 4. A filter medium according to any of the preceding aspects, wherein the non-woven fibrous web has one or both of: a maximum pore size of 150 micrometers, of 120 micrometers, or of 100 micrometers; or an average pore size of 20-100, or 20 to 80 micrometers where pore size (μm) is determined by the American Society of Testing and Materials (ASTM) Standard 316-03 (2011).

Aspect 5. A filter medium according to any of the preceding aspects, wherein the non-woven fibrous web has a grammage of at least 80, at least 100, at least 150, at least 200, or at least 250 grams per square meter.

Aspect 6. A filter medium according to any of the preceding aspects, wherein the non-woven fibrous web has a dry Mullen burst strength of at least 7 or at least 10 kilograms per square centimeter.

Aspect 7. A filter medium according to aspect 6 wherein the non-woven fibrous web retains at least 75% or at least 80% of its dry Mullen burst strength, as determined in accordance with ASTM D751 after acid cycling for four cycles.

Aspect 8. A filter medium according to any of the preceding aspects having a at least about 90%, or at least about 95% filtration efficiency at 2.5 μm particle size in the air test as described herein using IS05011 air test Standard.

Aspect 9. A filter medium according to any of the preceding aspects wherein the non-woven fibrous web has a shrinkage after 2 hours in a dry oven at 205° C. is less than 2%.

Aspect 10. A filter medium according to any of the preceding aspects wherein the non-woven fibrous web has a density of at least 0.3 g/cm$^3$.

Aspect 11. A filter medium according to any of the preceding aspects having a temperature resistance of up to 200° C.

Aspect 12. A method for the manufacture of the filter medium of any of the preceding aspects, the method comprising: wet-laying a furnish comprising the meta-aramid fibers and the meta-aramid fibrids to form a mat; drying the mat to form the non-woven fibrous web; and optionally calendering the non-woven fibrous web.

Aspect 13. A method according to aspect 12, further comprising saturating the non-woven fibrous web with a binder resin and then curing the binder resin.

Aspect 14. A method according to aspect 13, wherein saturating occurs after calendering.

Aspect 15. A method according to any one of aspects 12-13 wherein the calendering occurs at an elevated temperature.

Aspect 16. A calendered flue gas non-woven filter medium, comprising a non-woven fibrous web characterized by an average pore size of 20 to 80 micrometers, a maximum pore size of 100 micrometers, a dry Mullen burst strength of at least 7 kilograms per square centimeter, retention of 75% of the dry Mullen burst strength after acid cycling, a filtration efficiency of at least 90% for 2.5 micron particle, and a shrinkage of less than 2% after being heated in a dry oven at 205° C. for 2 hours.

Aspect 17. A filter medium according to any of aspects 1-11 or 16 further comprising a second material laminated to the non-woven fibrous web.

Aspect 18. A filter medium according to aspect 17 wherein the second material is a second non-woven fibrous web.

Aspect 19. A filter medium according to aspect 17 wherein the second material is a polymeric sheet or film, preferably a polytetrafluoroethylene.

Aspect 20. Using a filter medium of any aspects 1-11 or 16-19 in flue gas filtration.

Aspect 21. A flue gas filter assembly, comprising a flue gas inlet manifold, a flue gas outlet manifold, and a filtering apparatus positioned between the flue gas inlet manifold and the flue gas outlet manifold, wherein the filtration apparatus includes the flue gas filter medium of any of the aspects 1-11 or 16-19.

The compositions, articles, devices, and methods can alternatively comprise, consist of, or consist essentially of, any appropriate components or steps herein disclosed. The compositions, articles, devices, and methods can additionally, or alternatively, be formulated so as to be devoid, or substantially free, of any steps, components, materials, ingredients, adjuvants, species, components, or steps that are otherwise not necessary to the achievement of the function or objectives described herein. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect," "another aspect," "can be", "can have" and so forth, means that a particular element described in connection with the aspect is included in at least some aspects described herein, and may or may not be present in other aspects. In addition, it is to be understood that the described elements may be combined in any suitable manner in the various aspects.

Numerical values in this application, particularly as they relate to polymers or polymer compositions, reflect average values. Unless indicated to the contrary, the numerical values include numerical values that are the same when reduced to the same number of significant figures and numerical values that differ from the stated value by less than the experimental error of conventional measurement technique of the type described herein to determine the value. All ranges disclosed herein are inclusive of the recited endpoint and are independently combinable (e.g., the range of "from 2 to 10 g, preferably 3 to 7 g" is inclusive of the endpoints, 2 g, 7 g, and 10 g, the ranges such as 3 to 10 g, and all the intermediate values). All test methods are the most recent in effect as of the priority date of this application. Moreover, stated upper and lower limits can be combined to form ranges (e.g. "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent").

Unless otherwise defined, all technical and scientific terms used herein have the same meaning as commonly understood by one of ordinary skill in the art. All cited patents, patent applications, and other references are incorporated herein by reference in their entirety, but if a term in this application conflicts with a term in the incorporated reference, the meaning from this application takes precedence over the conflicting term from the incorporated reference.

The materials, methods, and examples disclosed herein are illustrative only and not intended to be limiting. Preferred methods and materials are described herein, although methods and materials similar or equivalent to those described herein can be used in practice or testing of the present disclosure.

What is claimed is:

1. A filter medium, the medium comprising a layer of a non-woven fibrous web having a thickness of 0.3 to 3 mm the non-woven fibrous web comprising at least 80 weight percent of meta-aramid fibers, from 0.1 to 20 weight percent of meta-aramid fibrids, each based on total amount of fibers and fibrids, and a binder resin; the filter medium having an air permeability of at least 19.4 cubic feet per minute per square foot according to ASTM D737.

2. The filter medium of claim 1 wherein the non-woven fibrous web is calendered.

3. The filter medium of claim 1, wherein the non-woven fibrous web has a grammage of at least 80 grams per square meter.

4. The filter medium of claim 1 wherein the non-woven fibrous web has a shrinkage after 2 hours in a dry oven at 205° C. of less than 2% wherein shrinkage is evaluated by measuring a dimension of the non-woven web other than thickness before and after the non-woven fibrous web is placed in the oven for 2 hours.

5. The filter medium of claim 1 further comprising another material laminated to the non-woven fibrous web.

6. The filter medium of claim 1 wherein the non-woven fibrous web has a density of at least 0.3 g/cm$^3$.

7. A method for the manufacture of the filter medium of claim 1, the method comprising:

wet-laying a furnish comprising the meta-aramid fibers and the meta-aramid fibrids to form a mat;

drying the mat to form the layer of the non-woven fibrous web;

saturating the non-woven fibrous web with a binder resin and then curing the binder resin; and optionally calendering after drying, to form the layer of the non-woven fibrous web having a thickness of 0.3 to 3 mm.

8. A flue gas filter assembly, comprising a flue gas inlet manifold, a flue gas outlet manifold, and a filtering apparatus positioned between the flue gas inlet manifold and the flue gas outlet manifold, wherein the filtration apparatus includes a filter medium comprising a non-woven fibrous web wherein the non-woven comprises at least 85 weight percent of meta-aramid fibers and from 0.1 to 20 weight percent of meta-aramid fibrids, each based on total amount of fibers and fibrids.

9. The filter medium of claim 1 wherein the binder resin is a phenolic binder resin.

10. The method of claim 7 wherein the saturating of the non-woven fibrous web with a binder resin occurs after calendaring.

11. The filter medium of claim 1 wherein the fibrids are present in an amount less than 15%.

12. A filter medium, the medium comprising a non-woven fibrous web the non-woven fibrous web comprising at least 80 weight percent of meta-aramid fibers and from 0.1 to 20 weight percent of meta-aramid fibrids, each based on total amount of fibers and fibrids, and a binder resin, wherein the non-woven fibrous web has a thickness of 0.772 to 3 mm; and the filter medium having an air permeability of at least 19.4 cubic feet per minute per square foot according to ASTM D737.

13. The flue gas filter assembly of claim 12 wherein the non-woven fibrous web comprises 0.1 to less than 15 weight percent of meta-aramid fibrids.

* * * * *